United States Patent
Wang

(10) Patent No.: US 6,539,714 B1
(45) Date of Patent: Apr. 1, 2003

(54) SYSTEM FOR ESTIMATING TURBOCHARGER ROTATIONAL SPEED

(75) Inventor: Yue Yun Wang, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/102,233

(22) Filed: Mar. 19, 2002

(51) Int. Cl.[7] ............................................. F02B 33/44
(52) U.S. Cl. ........................... 60/598; 60/605.1; 60/611
(58) Field of Search ............................... 60/598, 605.1, 60/605.2, 611

(56) References Cited

U.S. PATENT DOCUMENTS

| | | | |
|---|---|---|---|
| 4,634,887 A | * | 1/1987 | Balch et al. ................... 290/3 |
| 4,817,387 A | * | 4/1989 | Lashbrook ................... 60/611 |
| 5,377,112 A | | 12/1994 | Brown, Jr. et al. |
| 5,574,645 A | | 11/1996 | Meeker et al. |
| 5,585,553 A | | 12/1996 | Schricker |
| 5,910,176 A | | 6/1999 | Creger |
| 5,974,870 A | | 11/1999 | Treinies et al. |
| 6,202,415 B1 | | 3/2001 | Lohmann et al. |
| 6,209,390 B1 | | 4/2001 | LaRue et al. |
| 6,220,223 B1 | | 4/2001 | Weisman, II et al. |
| 6,234,149 B1 | | 5/2001 | Mills et al. |
| 6,240,343 B1 | | 5/2001 | Sarangapani et al. |
| 6,250,145 B1 | | 6/2001 | Honold et al. |
| 6,256,942 B1 | | 7/2001 | Schatz |
| 6,256,992 B1 | | 7/2001 | Lewis, Jr. et al. |
| 6,298,718 B1 | | 10/2001 | Wang |
| 6,314,359 B1 | | 11/2001 | Janic et al. |
| 6,401,457 B1 | * | 6/2002 | Wang et al. ................... 60/599 |

* cited by examiner

*Primary Examiner*—Hoang Nguyen
(74) *Attorney, Agent, or Firm*—Barnes & Thonrburg

(57) ABSTRACT

A system for estimating turbocharger rotational speed includes a first pressure sensor producing a first pressure signal indicative of the pressure of air supplied by a turbocharger compressor to an intake manifold of an internal combustion engine, a second pressure sensor producing a second pressure signal indicative of the pressure of air entering the turbocharger compressor, a temperature sensor producing a temperature signal indicative of the temperature entering the compressor, a speed sensor producing a speed signal indicative of the rotational speed of the engine, and a control computer estimating the turbocharger rotational speed as a function of the first pressure signal, the second pressure signal, the temperature signal and the speed signal.

14 Claims, 6 Drawing Sheets

SYSTEM FOR ESTIMATING TURBOCHARGER ROTATIONAL SPEED

FIELD OF THE INVENTION

The present invention relates generally to systems for estimating turbocharger operating parameters, and more specifically to systems for estimating turbocharger rotational speed.

BACKGROUND AND SUMMARY OF THE INVENTION

Turbochargers are well known devices for pressurizing intake air entering the combustion chambers of an internal combustion engine to thereby increase the efficiency and power output of the engine. In general, pressurizing the intake air increases the quantity of air entering the engine cylinders during the intake stroke, and this allows more fuel to be utilized in establishing a desired air-to-fuel ratio. Increased available engine output torque and power is thereby realized.

In a turbocharged engine, the exhaust manifold of the engine is fluidly coupled to a turbine component of the turbocharger via an exhaust conduit, and the exhaust gas flowing through the exhaust conduit causes a turbine wheel within the turbine to rotate at a rate determined by the pressure and flow rate of exhaust gas. A compressor wheel within a compressor component of the turbocharger is mechanically coupled to the turbine wheel, and is therefore rotatably driven by the turbine wheel. An inlet of the compressor receives fresh ambient air, and an outlet of the compressor is fluidly coupled to the intake manifold of the engine via an intake conduit. The rotatably driven action of the compressor wheel increases the amount of intake air supplied to the intake conduit, thereby resulting in an increased, or so-called "boost", pressure therein.

An exhaust gas recirculation (EGR) system implemented in such a turbocharged engine supplies controlled amounts of exhaust gas from the exhaust manifold to the intake manifold via an EGR conduit. In order to sustain positive EGR flow through the EGR conduit, it is necessary to maintain the pressure in the exhaust conduit greater than that in the intake conduit, and turbochargers in EGR-based engines must therefore typically operate at higher rotational speeds than in non EGR-based engines. In either case, it is therefore desirable to have accurate knowledge of the turbocharger rotational speed so that it may be controlled to ensure positive EGR flow while also maintaining turbocharger speed within safe operating limits.

In cases where implementation of a turbocharger speed sensor is impractical or cost prohibitive, and/or in cases where redundant turbocharger speed information is desired, what is needed is a system for accurately estimating turbocharger rotational.

The present invention accordingly provides a system for estimating turbocharger speed as a function of the temperature and pressure of air entering the turbocharger compressor, the pressure of air supplied by the compressor to the intake manifold of the engine and the rotational speed of the engine.

These and other objects of the present invention will become more apparent from the following description of the preferred embodiment.

DESCRIPTION OF THE PREFERRED EMBODIMENTS

Figure 1:
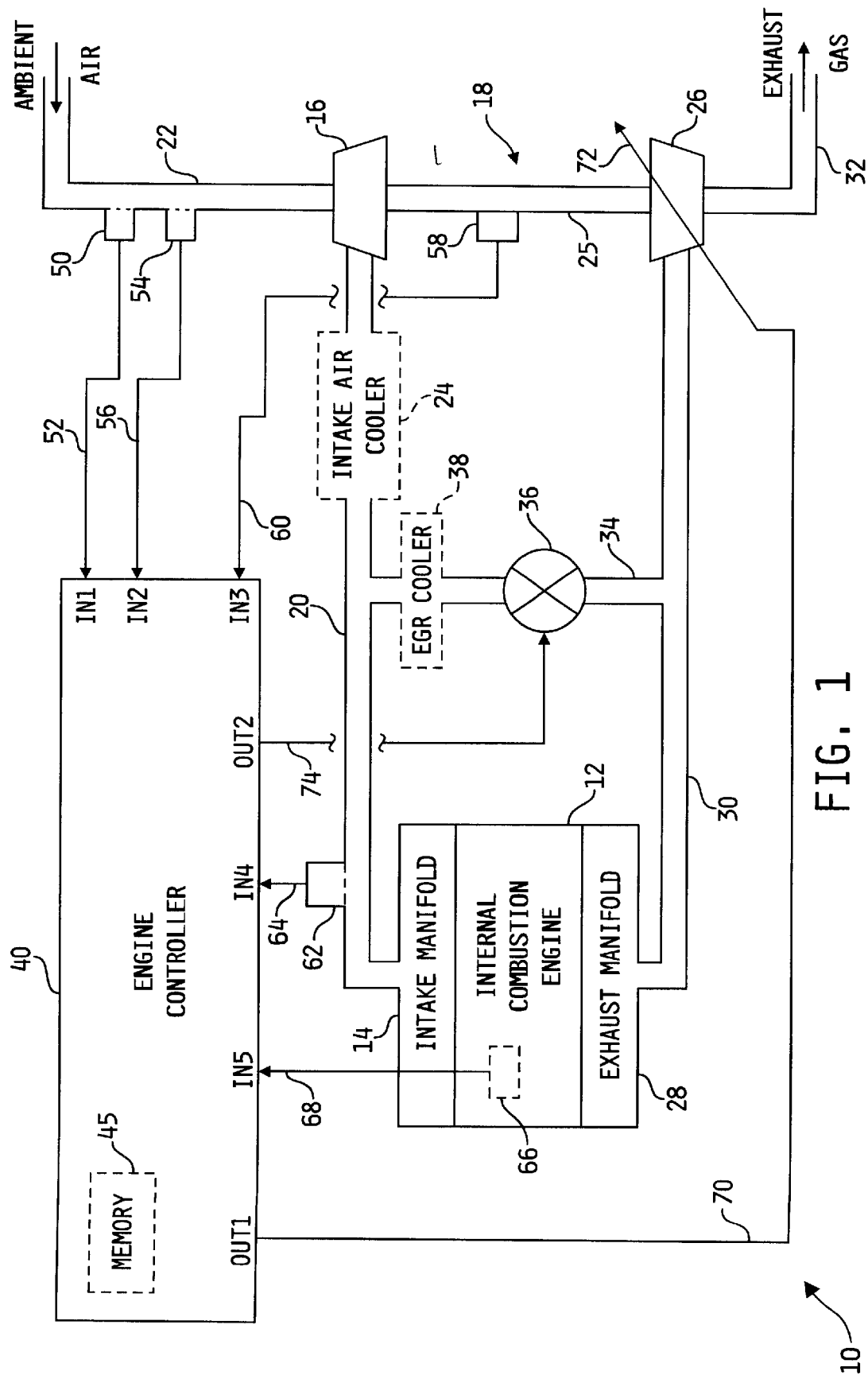
FIG. 1 is a diagrammatic illustration of one preferred embodiment of a system for estimating turbocharger operating parameters, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for estimating turbocharger operating parameters, in accordance with the present invention, is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh air therefrom. Optionally, as shown in phantom in FIG. 1, system 10 may include an intake air cooler 24 of known construction disposed in line with intake conduit 20 between the turbocharger compressor 16 and the intake manifold 14. The turbocharger compressor 16 is mechanically coupled to a turbocharger turbine 26 via a drive shaft 25, wherein turbine 26 includes a turbine inlet fluidly coupled to an exhaust manifold 28 of engine 12 via an exhaust conduit 30, and further includes a turbine outlet fluidly coupled to ambient via an exhaust conduit 32. An EGR valve 36 is disposed in line with an EGR conduit 34 disposed in fluid communication with the intake conduit 20 and the exhaust conduit 30, and an EGR cooler 38 of known construction may optionally be disposed in line with EGR conduit 34 between EGR valve 36 and intake conduit 20 as shown in phantom in FIG. 1.

System 10 includes an engine controller 40 that is preferably microprocessor-based and is generally operable to control and manage the overall operation of engine 12. Engine controller 40 includes a memory unit 45 as well as a number of inputs and outputs for interfacing with various sensors and systems coupled to engine 12. Controller 40, in one embodiment, may be a known control unit sometimes referred to as an electronic or engine control module (ECM), electronic or engine control unit (ECU) or the like, or may alternatively be a general purpose control circuit capable of operation as will be described hereinafter. In any case, engine controller 40 preferably includes one or more control algorithms, as will be described in greater detail hereinafter, for estimating turbocharger operating parameters based on input signals provided by a number of engine and/or turbocharger operating condition sensors.

Engine controller 40 includes a number of inputs for receiving signals from various sensors or sensing systems associated with system 10. For example, system 10 includes a temperature sensor 50 that is preferably disposed in fluid communication with intake conduit 22 and electrically connected to an input (IN1) of engine controller 40 via signal path 52. Sensor 50 may be of known construction and generally operable to produce a compressor inlet temperature signal (CIT) on signal path 52 that is indicative of the temperature of ambient air entering the inlet of compressor 16 (i.e., entering the intake conduit 22). It is to be understood that for the purposes of the present invention, sensor 50 need not be disposed in fluid communication with intake conduit 22 and may instead be positioned in any convenient location relative to system 10 as long as sensor 50 is operable to produce a signal on signal path 52 indicative of the temperature of fresh ambient air entering conduit 22.

System 10 further includes a pressure sensor 54 that is preferably disposed in fluid communication with intake conduit 22 and electrically connected to an input (IN2) of engine controller 40 via signal path 56. Sensor 54 may be of known construction and is generally operable to produce a compressor inlet pressure signal (CIP) on signal path 56 that is indicative of the pressure of ambient air entering the inlet of compressor 16 (i.e., entering intake conduit 22). It is to be understood that for the purposes of the present invention, sensor 54 need not be disposed in fluid communication with intake conduit 22 and may instead be positioned in any convenient location relative to system 10 as long as sensor 54 is operable to produce a signal on signal path 56 indicative of the pressure of ambient air entering conduit 22.

In one embodiment, system 10 further includes a speed sensor 58 that is preferably disposed about, or in proximity with, the turbocharger drive shaft 25 and electrically connected to an input (IN3) of engine controller 40 via signal path 60. Sensor 58 may be of known construction and is generally operable to produce a turbocharger speed signal (TS) on signal path 60 that is indicative of the rotational speed of the turbocharger drive shaft 25. In one embodiment, sensor 58 is a variable reluctance sensor operable to determine turbocharger rotational speed by sensing passage thereby of one or more detectable structures formed on shaft 25. Alternatively, turbocharger speed sensor 58 may be any other known sensor operable as just described and suitably located relative to turbocharger drive shaft 25.

In another embodiment, system 10 further includes a pressure sensor 62 that is preferably disposed in fluid communication with intake conduit 20 and electrically connected to an input (IN4) of engine controller 40 via signal path 64. Sensor 62 may be of known construction and is generally operable to produce a compressor outlet pressure signal (COP) on signal path 64 that is indicative of the pressure within intake conduit 20.

System 10 further includes an engine speed sensor 66 that is electrically connected to an input (IN5) of engine controller 40 via signal path 68. In one embodiment, sensor 66 is a Hall effect sensor operable to sense passage thereby of a number of teeth formed on a gear or tone wheel rotation synchronously with the engine 12. Alternatively, sensor 66 may be a variable reluctance sensor or other known speed sensor, and is in any case operable to produce a speed signal on signal path 68 indicative of the rotational speed of engine 12.

Engine controller 40 also includes a number of outputs for controlling one or more engine control mechanism associated with engine 12 and/or system 10. For example, engine controller 40 also includes at least one output for controlling turbocharger swallowing capacity/efficiency, wherein the term "turbocharger swallowing capacity/efficiency" is defined for purposes of the present invention as the gas flow capacity of the turbocharger turbine 26. For example, as illustrated in FIG. 1, output OUT1 of engine controller 40 is electrically connected to a turbocharger swallowing capacity/efficiency control mechanism 72 via signal path 70, wherein the turbocharger swallowing capacity/efficiency control mechanism 72 is responsive to one or more turbocharger control signals to modify the swallowing capacity and/or efficiency of turbocharger 18.

In general, the present invention contemplates controlling the swallowing capacity and/or efficiency of the turbocharger 18 via one or more known control mechanisms 70 under the direction of engine controller 40. Examples of such control mechanisms include, but are not limited to, any combination of a mechanism for varying the geometry of the turbocharger turbine 26, a wastegate disposed between conduits 30 and 32 for selectively diverting exhaust gas from the turbocharger turbine 26, and an exhaust throttle for selectively controlling the flow rate of exhaust gas through either of conduits 30 and 32.

Engine controller 40 further includes a second output (OUT2) electrically connected to EGR valve 36 via signal path 74. Controller 40 is operable, in a known manner, to control the cross-sectional flow area of valve 36 to thereby selectively control the flow of recirculated exhaust gas therethrough.

Based on conventional compressor flow dynamics, it is well known in the art that given any two of the following variables, the remaining may be uniquely determined:

$$[TS/sqrt(CIT),\ COP/CIP,\ MAF*sqrt(CIT)/CIP],$$

wherein,

MAF is the mass flow of air entering the inlet of the turbocharger compressor 16, CIT is the temperature of air entering the compressor 16, CIP is the pressure of air entering the compressor 16, COP is the pressure of air within the intake conduit 20 (i.e., at the outlet of the turbocharger compressor), and therefore represents the absolute boost pressure within conduit 20, and TS is the rotational speed of the turbocharger 18.

In the above relationships, the term TS/sqrt(CIT) refers to a temperature-corrected turbocharger speed, hereinafter referred to as CTS, the term COP/CIP refers to a compressor pressure ratio, hereinafter represented as PR and the term MAF*sqrt(CIT)/CIP refers to a corrected compressor mass flow rate, hereinafter represented as CMAF.

Figure 2:
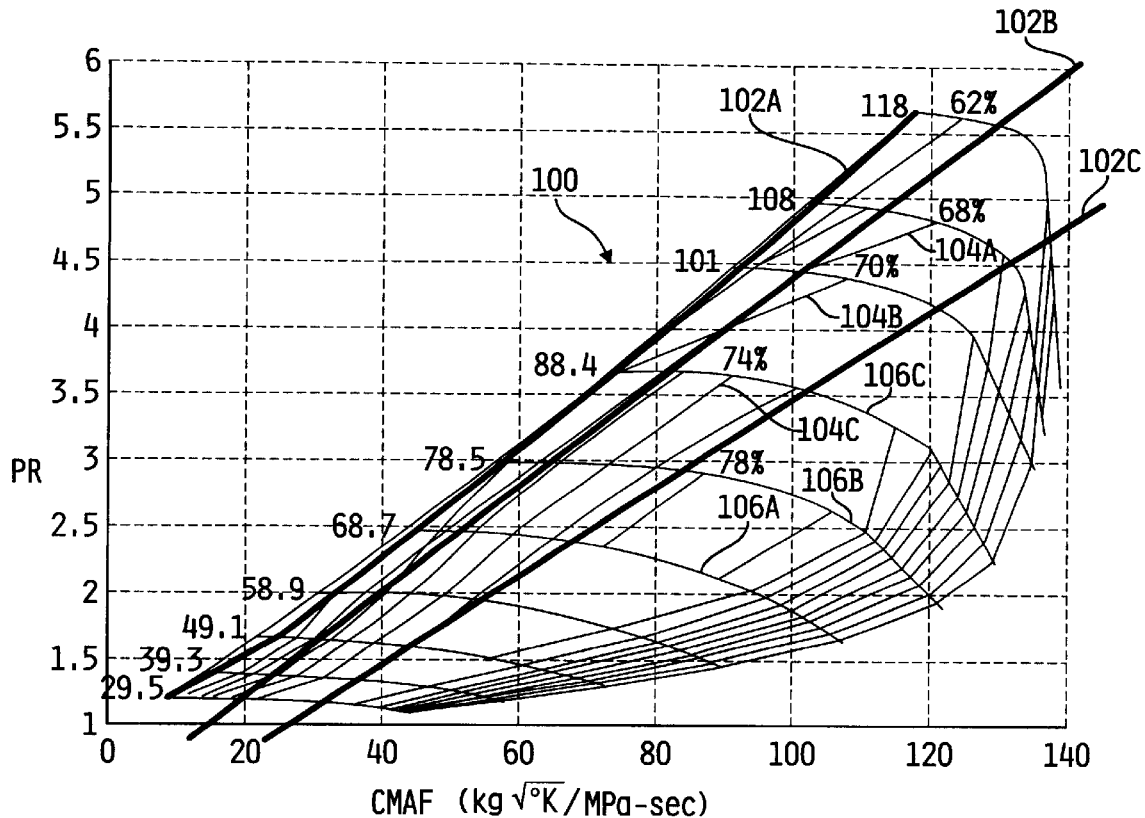
FIG. 2 is a compressor map of turbocharger compressor ratio vs. intake mass air flow illustrating some of the turbocharger operating parameter estimation concepts of the present invention.

Relationships between CTS, PR and CMAF may be represented by a compressor map of the type illustrated in FIG. 2. Referring to FIG. 2, an example compressor map for one known turbocharged engine is shown as a plot 100 of compressor pressure ratio, PR, vs. corrected compressor mass flow rate, CMAF. The various vertically slanted/ upwardly sloping lines in plot 100 represent lines of constant compressor efficiency. For example, line 104A corresponds to 68% compressor efficiency, 104B corresponds to 70% compressor efficiency, line 104C corresponds to 74% compressor efficiency, etc. Conversely, the horizontal/downwardly sloping lines in plot 100 represent lines of constant temperature-corrected turbocharger rotational speed, CTS. For example, line 106A corresponds to 68,700 RPM/sqrt(CIT), line 106B corresponds to 78,500 RPM/sqrt(CIT), line 106C corresponds to 88,400 RPM/sqrt(CIT), etc. Finally, the upwardly diagonal thick lines in plot 100 represent lines of constant engine rotational speed, ES. For example, line 102A corresponds to 850 RPM, line 102B corresponds to 1200 RPM, line 102C corresponds to 1800 RPM, etc.

In relation to plot 100, the temperature-corrected turbocharger rotational speed, CTS, can be estimated according to the equation:

$$CTS = f(PR, CMAF) \quad (1).$$

In embodiments of system 100 that include a mass air flow sensor disposed in fluid communication with intake conduit 22, CTS may be derived directly from plot 100 as a function of measured values of PR and CMAF. However, in embodiments of system 100 that do not include such a mass airflow sensor, and/or in embodiments of system 100 that include an intake mass air flow estimation algorithm having less than desirable accuracy, CTS may not be derived directly as a function of PR and CMAF.

Observation of plot 100 of FIG. 2 reveals that the temperature-corrected turbocharger speed, CTS, is more sensitive to changes in compressor pressure ratio, PR, than to corrected compressor mass flow, CMAF, and is therefore a stronger function of PR than of CMAF. Additionally, knowledge of current engine speed, ES, enables mapping of compressor pressure ratio fluctuations to constant temperature-corrected turbocharger speed values as illustrated in FIG. 2 by constant engine speed lines 102A–102C. Accordingly, the relationship of equation (1) may be simplified to the equation:

$$CTS = f(PR, ES) \quad (2),$$

such that an estimated turbocharger speed ($TS_E$) is then defined by the equation:

$$TS_E = sqrt(CIT) * f[(COP/CIP), ES] \quad (3).$$

Figure 3:
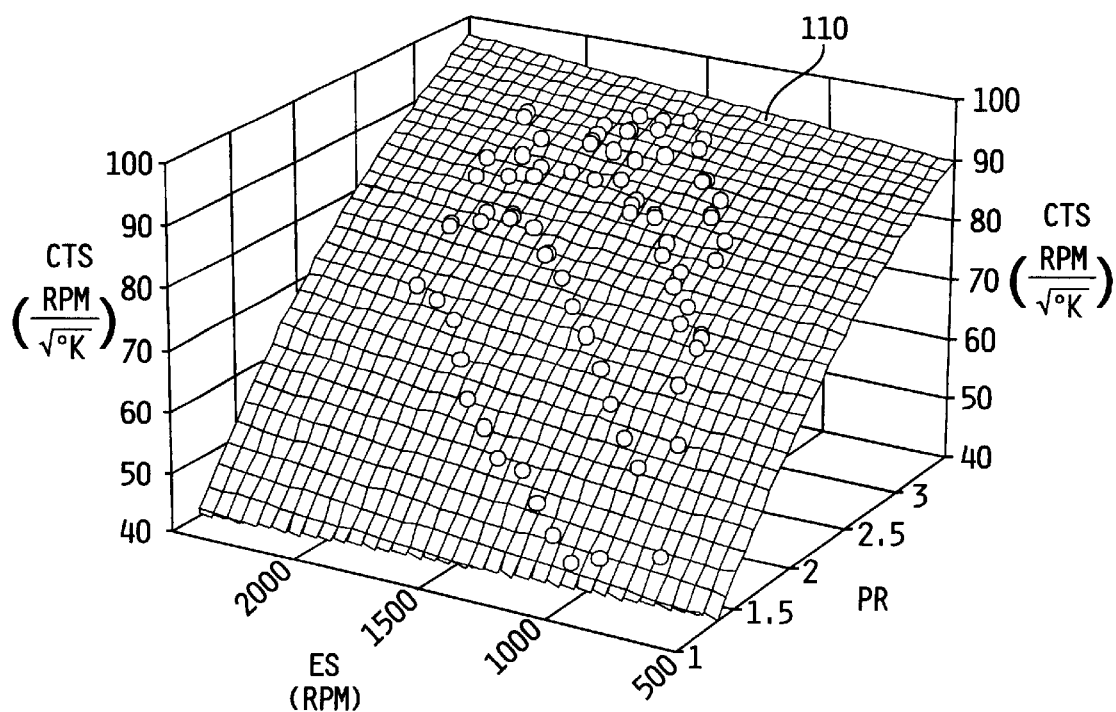
FIG. 3 is a 3-D plot illustrating one preferred technique for estimating turbocharger rotational speed by mapping corrected turbocharger speed to current values of engine speed and compressor pressure ratio, in accordance with the present invention.

Referring now to FIG. 3, a three-dimensional plot 110 of the temperature-corrected turbocharger speed, CTS, compressor pressure ratio, PR, and engine speed, ES, is illustrated for an example engine including an air handling system (e.g., EGR system, turbocharger swallowing capacity/efficiency control mechanism(s)) of the type described with respect to FIG. 1. For every given pair of PR and ES, plot 110 illustrates that there exists a uniquely determined temperature-corrected turbocharger speed value, CTS.

Figure 4:
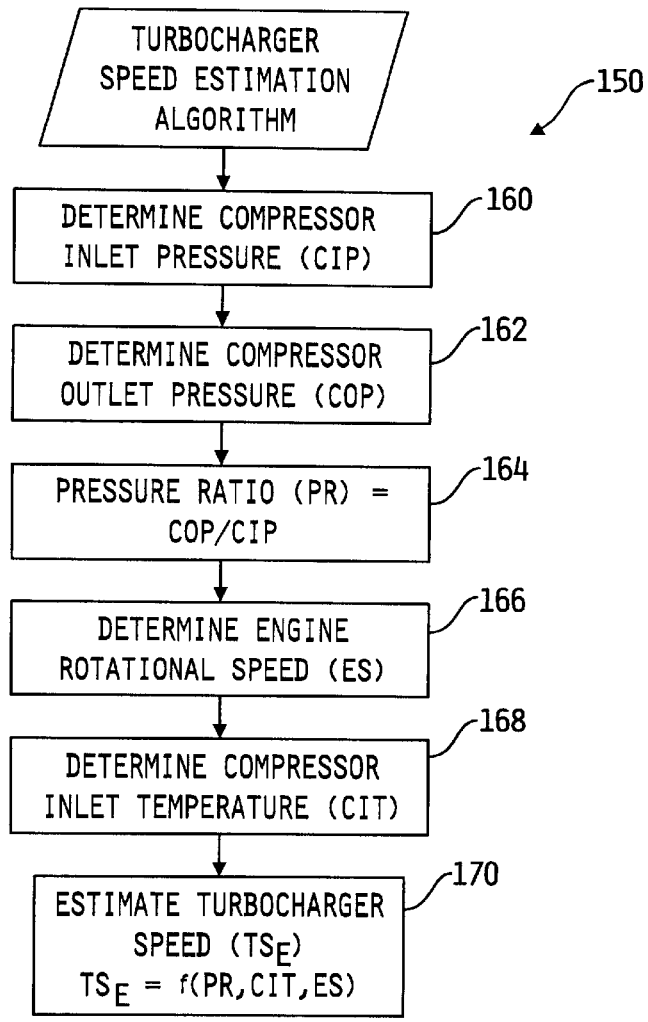
FIG. 4 is a flowchart illustrating one preferred embodiment of a software algorithm for estimating turbocharger rotational speed based on the plot of FIG. 3, in accordance with the present invention.

Referring now to FIG. 4, a flowchart is shown illustrating one preferred embodiment of a generalized software algorithm 150 for estimating turbocharger rotational speed, in accordance with the present invention. Algorithm 150 may be stored within memory 45 and executed in a known manner by engine controller 40, although the present invention contemplates that algorithm 150 may be executed by another controller or processor, wherein information may be shared with engine controller 40 via a suitable data bus or link. For description purposes, however, algorithm 150 will be described as being executed by engine controller 40.

Algorithm 150 begins at step 160 where controller 40 is operable to determine compressor inlet pressure, CIP, via information provided by pressure sensor 54 (FIG. 1). Thereafter at step 162, controller 40 is operable to determine compressor outlet pressure, COP, via information provided by pressure sensor 62. Thereafter at step 164, controller 40 is operable to compute the compressor pressure ratio, PR, as a ratio of COP and CIP.

Following step 164, algorithm execution advances to step 166 where controller 40 is operable to determine engine rotational speed, ES, via information provided by speed sensor 66. Thereafter at step 168, controller 40 is operable to determine compressor inlet temperature, CIT, via information provided by temperature sensor 50.

Following step 168, algorithm execution advances to step 170 where controller 40 is operable to determine an estimate of the turbocharger rotational speed, $TS_E$, as a function of PR, ES and CIT. The present invention contemplates a number of techniques for executing step 170 to map the variables PR and ES of equation (3) to corresponding turbocharger rotational speed estimate values. For example, in one embodiment, the data in plot 110 may be stored in memory 45 in graphical or table form. In this embodiment, controller 40 is operable to execute step 170 by mapping current values of PR and ES to CTS using the stored information for plot 110, and thereafter compute $TS_E$ by multiplying the resulting CTS value by the square root of CIT. In the mapping of current values of PR and ES to CTS, estimation values in between data points may be obtained using known linear or non-linear interpolation techniques.

In an alternate embodiment, the three-dimensional plot 110 of FIG. 3 may be represented by a polynomial stored within memory 45, wherein such a polynomial is solved for CTS given known values of the two remaining parameters. For example, plot 110 of FIG. 3 represents a smooth surface and can therefore be modeled as a second-order polynomial according to the equation:

$$CTS = a + b*PR + C*PR^2 + d*ES + e*ES^2 + f*PR*ES \quad (4),$$

wherein a, b, c, d, e and f represent model constants. In this embodiment, engine controller 40 is operable to execute step 170 of algorithm 150 by solving equation (4) as a function of current values of PR and ES, and then computing the turbocharger rotational speed estimate $TS_E$ by multiplying the result by the square root of CIT.

In yet another alternate embodiment, the three-dimensional plot 110 of FIG. 3 may be modeled by a two-input neural network trained as an appropriate surface for fitting the data points of CTS according to the known variables PR and ES. In this embodiment, engine controller

40 is operable to execute step 170 of algorithm 150 by computing CTS according to the two-input neural network, and then computing the turbocharger rotational speed estimate $TS_E$ by multiplying the result by the square root of CIT.

Figure 5:
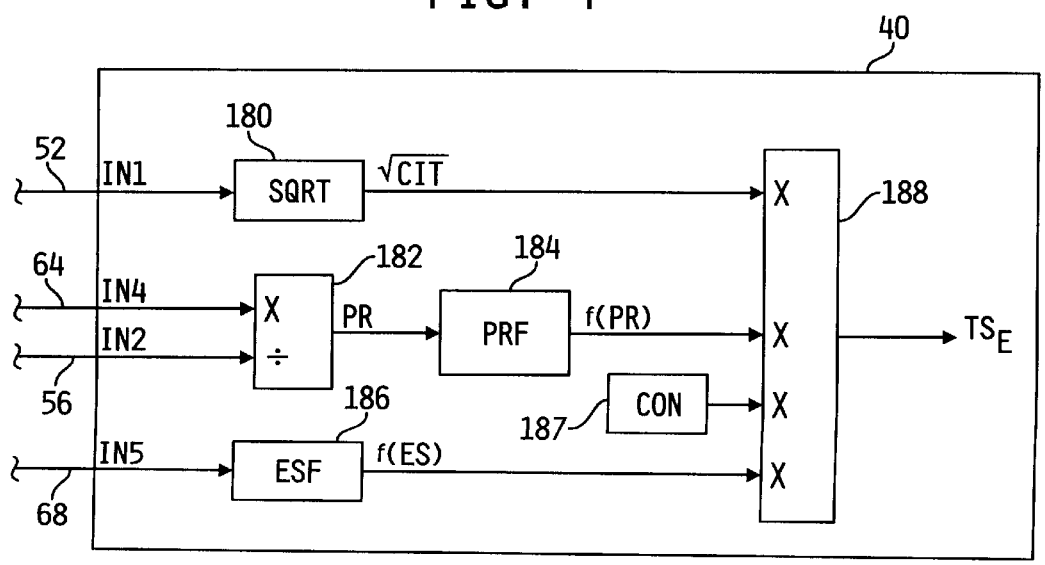
FIG. 5 is a diagrammatic illustration of one preferred embodiment of a portion of the control computer of FIG. 1 illustrating an alternate technique for estimating turbocharger rotational speed, in accordance with the present invention.

In a further alternate embodiment, the plot 110 of FIG. 3 may be modeled as a second-order polynomial for PR and a scaling function of ES according to the equation:

$$CTS=(a+b*PR+c*PR^2)*f(ES) \qquad (5),$$

wherein the term $(a+b*PR+c*PR^2)$ represents the second-order PR model and f(ES) is a scaling factor depending upon the current value of engine rotational speed, and a, b and c represent model constants. In this embodiment, engine controller 40 is operable to execute step 170 of algorithm 150 by solving equation (5) for CTS, and then computing the turbocharger rotational speed estimate $TS_E$ by multiplying the result by the square root of CIT. Referring to FIG. 5, a portion of engine controller 40 is shown illustrating one preferred software structure for computing the turbocharger rotational speed estimate, $TS_E$, in accordance with equation (5). In this embodiment, controller 40 includes a SQRT block 180 receiving as an input the CIT signal on signal path 52 and producing as an output a value corresponding to the square root of CIT. An arithmetic block 182 receives as inputs the COP signal on signal path 64 and the CIP signal on signal path 56, and produces as an output the pressure ratio value PR by dividing COP by CIP.

A compressor ratio function block 184 receives the compressor pressure ratio value, PR, and produces as an output the result of the pressure ratio polynomial $(a+b*PR+c*PR^2)$ of equation (5). In one embodiment, block 184 may be implemented in the form of an equation, wherein block 184 is operable to compute $(a+b*PR+c*PR^2)$ as a function of PR. Alternatively, block 184 may be implemented in graphical or table form for mapping PR values to $(a+b*PR+c*PR^2)$ values.

Figure 6:
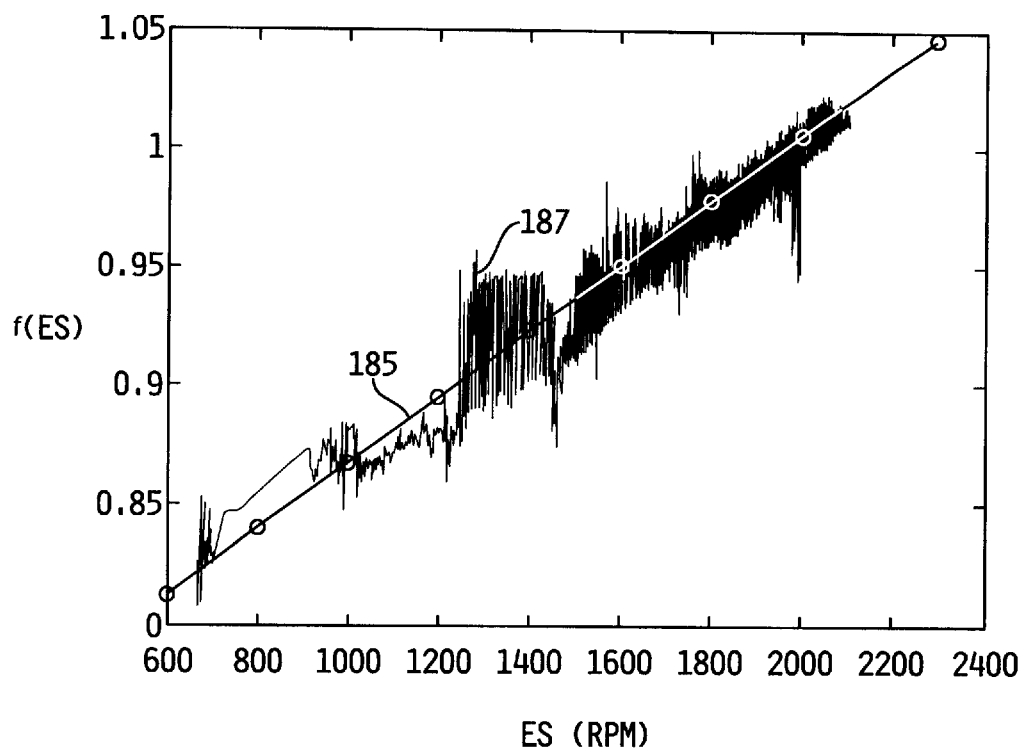
FIG. 6 is a plot of engine speed scaling factor vs. engine speed illustrating one preferred embodiment of the engine speed scaling factor block of FIG. 5.

An engine speed function block 186 receives the engine speed signal on signal path 68 and produces as an output the result of the engine speed scaling function of equation (5). In one embodiment, block 186 may be implemented as in the form of a scaling equation, wherein block 186 is operable to convert ES to an engine speed scaling factor in accordance with this equation. Alternatively, block 186 may be implemented in graphical or table form for mapping ES values to engine speed scaling factor values. In any case, one example engine speed scaling function 185 is illustrated in FIG. 6 along with test data 187 from which function 185 is derived. Those skilled in the art will recognize that other engine speed scaling functions may be used, wherein any such scaling function will generally be based on test data for the particular application.

The outputs of each of blocks 180, 184 and 186, as well as a conversion factor CON (60 sec/1000 RPM) are provided as inputs to a multiplication block 188 producing as an output the turbocharger rotational speed estimate, $TS_E$ according to the equation:

$$TS_E sqrt(CIT)*(a+b*PR+c*PR^2)*f(ES) \qquad (6).$$

Those skilled in the art will recognize that the accuracy of the turbocharger speed estimate, $TS_E$, may be further improved by considering additional engine operating conditions such as, for example, intake manifold temperature and/or EGR flow rate. In general, it will be recognized that there exists a tradeoff between estimate accuracy and model complexity, and it will accordingly be appreciated that the application requirements will generally dictate the required accuracy which will, in turn, dictate the model complexity.

Referring again to FIG. 2, the pressure ratio, PR, can also be estimated from the compressor map plot 100 according to the equation:

$$PR=f(CTS, CMAF) \qquad (7).$$

In embodiments of system 100 that include a mass air flow sensor disposed in fluid communication with intake conduit 22, PR may be derived directly from plot 100 as a function of measured values of CTS and CMAF. However, in embodiments of system 100 that do not include such a mass airflow sensor, and/or in embodiments of system 100 that include an intake mass air flow estimation algorithm having less than desirable accuracy, PR may not be derived directly as a function of PR and CMAF.

Observation of plot 100 of FIG. 2 reveals that the compressor pressure ratio, PR, is more sensitive to changes in temperature-corrected turbocharger speed, CTS, than to corrected compressor mass flow, CMAF, and is therefore a stronger function of CTS than of CMAF. Additionally, as described hereinabove, knowledge of current engine speed, ES, enables mapping of compressor pressure ratio fluctuations to constant temperature-corrected turbocharger speed values as illustrated in FIG. 2 by constant engine speed lines 102A–102C. Accordingly, the relationship of equation (7) may be simplified to the equation:

$$PR=f(CTS, ES) \qquad (8),$$

such that an estimated compressor outlet pressure, COP, hereinafter estimated absolute boost pressure, $ABP_E$ is then defined by the equation:

$$ABP_E=CIP*f\{[TS/sqrt(CIT)], ES\} \qquad (9).$$

Figure 7:
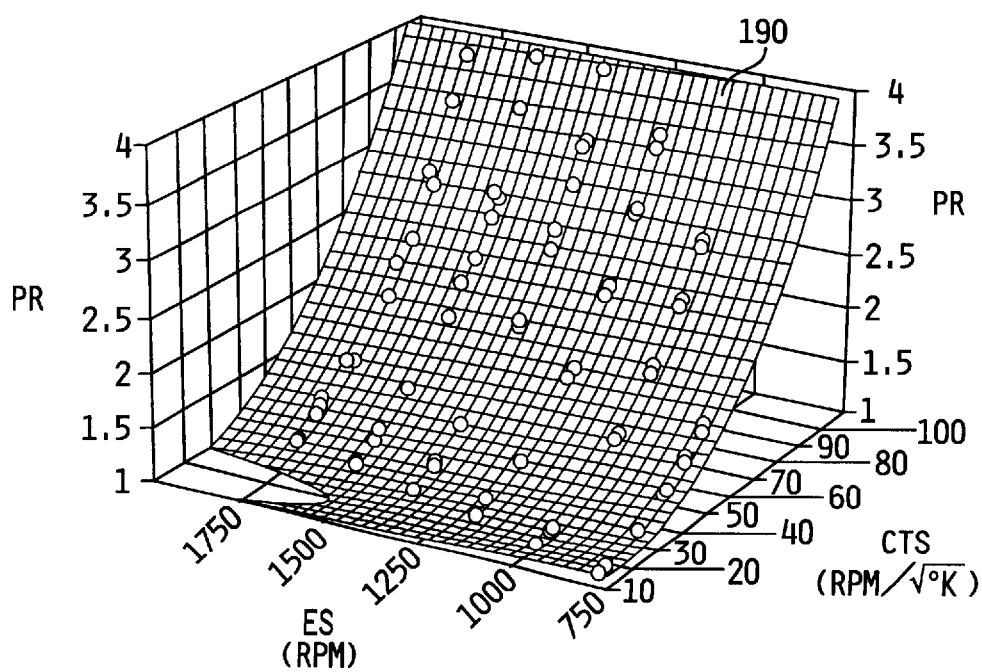
FIG. 7 is a 3-D plot illustrating one preferred technique for estimating absolute boost pressure by mapping compressor pressure ratio to current values of engine speed and corrected turbocharger speed, in accordance with the present invention.

Referring now to FIG. 7, a three-dimensional plot 190 of the pressure ratio, PR, temperature-corrected turbocharger speed, CTS, and engine speed, ES, is illustrated for an example engine including an air handling system (e.g., EGR system, turbocharger swallowing capacity/efficiency control mechanism(s)) of the type described with respect to FIG. 1. For every given pair of CTS and ES, plot 190 illustrates that there exists a uniquely determined compressor pressure ratio value, PR, and therefore a uniquely determined absolute boost pressure estimate value, $ABP_E$.

Figure 8:
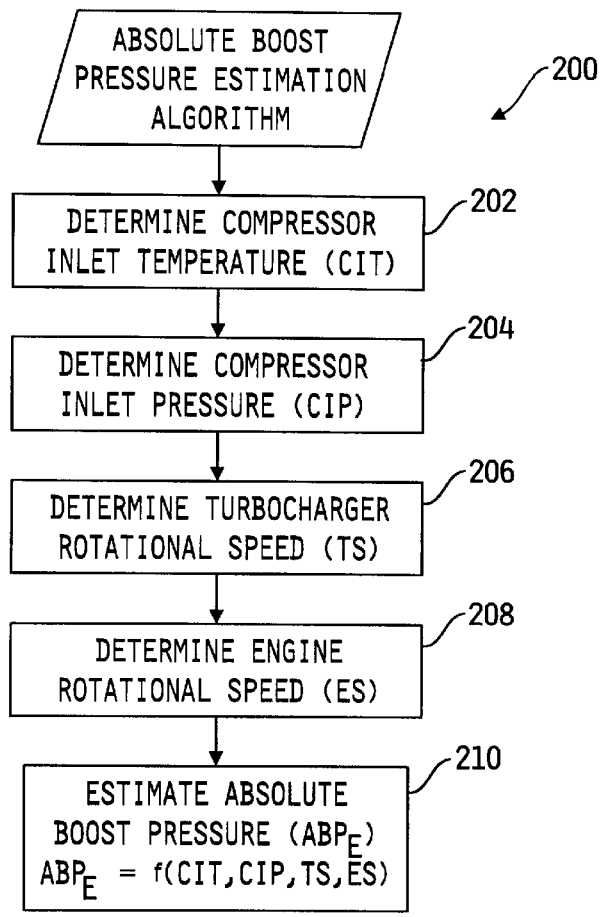
FIG. 8 is a flowchart illustrating one preferred embodiment of a software algorithm for estimating absolute boost pressure based on the plot of FIG. 7, in accordance with the present invention.

Referring now to FIG. 8, a flowchart is shown illustrating one preferred embodiment of a generalized software algorithm 200 for estimating absolute boost pressure, in accordance with the present invention. Algorithm 200 may be stored within memory 45 and executed in a known manner by engine controller 40, although the present invention contemplates that algorithm 200 may be executed by another controller or processor, wherein information may be shared with engine controller 40 via a suitable data bus or link. For description purposes, however, algorithm 200 will be described as being executed by engine controller 40.

Algorithm 200 begins at step 202 where controller 40 is operable to determine compressor inlet temperature, CIT, via information provided by pressure sensor 50 (FIG. 1). Thereafter at step 204, controller 40 is operable to determine compressor inlet pressure, CIP, via information provided by pressure sensor 54. Thereafter at step 206, controller 40 is operable to determine turbocharger rotational speed, TS, via information provided by speed sensor 58. Thereafter at step 208, controller 40 is operable to determine engine rotational speed, ES, via information provided by speed sensor 66.

Following step 208, algorithm execution advances to step 210 where controller 40 is operable to determine an estimate of the absolute boost pressure, $ABP_E$, as a function of CTS, ES and CIT. The present invention contemplates a number of techniques for executing step 210 to map the variables CTS and ES of equation (8) to corresponding absolute boost pressure estimate values. For example, in one embodiment, the data in plot 190 may be stored in memory 45 in graphical or table form. In this embodiment, controller 40 is operable to execute step 210 by mapping current values of CTS and ES to PR using the stored information for plot 190, and thereafter compute $ABP_E$ by multiplying the resulting PR value by the current value of CIP. In the mapping of current values of CTS and ES to PR, estimation values in between data points may be obtained using known linear or non-linear interpolation techniques.

In an alternate embodiment, the three-dimensional plot 190 of FIG. 7 may be represented by a polynomial stored within memory 45, wherein such a polynomial is solved for PR given known values of the two remaining parameters. For example, plot 190 of FIG. 7 represents a smooth surface and can therefore be modeled as a second-order polynomial according to the equation:

$$PR = a + b*CTS + C*CTS^2 + d*ES + e*ES^2 + f*CTS*ES \qquad (9),$$

wherein a, b, c, d, e and f represent model constants. In this embodiment, engine controller 40 is operable to execute step 210 of algorithm 200 by solving equation (9) as a function of current values of CTS and ES, and then computing the absolute boost pressure estimate $ABP_E$ by multiplying the result by the current value of CIP.

In yet another alternate embodiment, the three-dimensional plot 190 of FIG. 7 may be modeled by a two-input neural network trained as an appropriate surface for fitting the data points of PR according to the known variables CTS and ES. In this embodiment, engine controller 40 is operable to execute step 210 of algorithm 200 by computing PR according to the two-input neural network, and then computing the absolute boost pressure estimate $ABP_E$ by multiplying the result by the current value of CIP.

Figure 9:
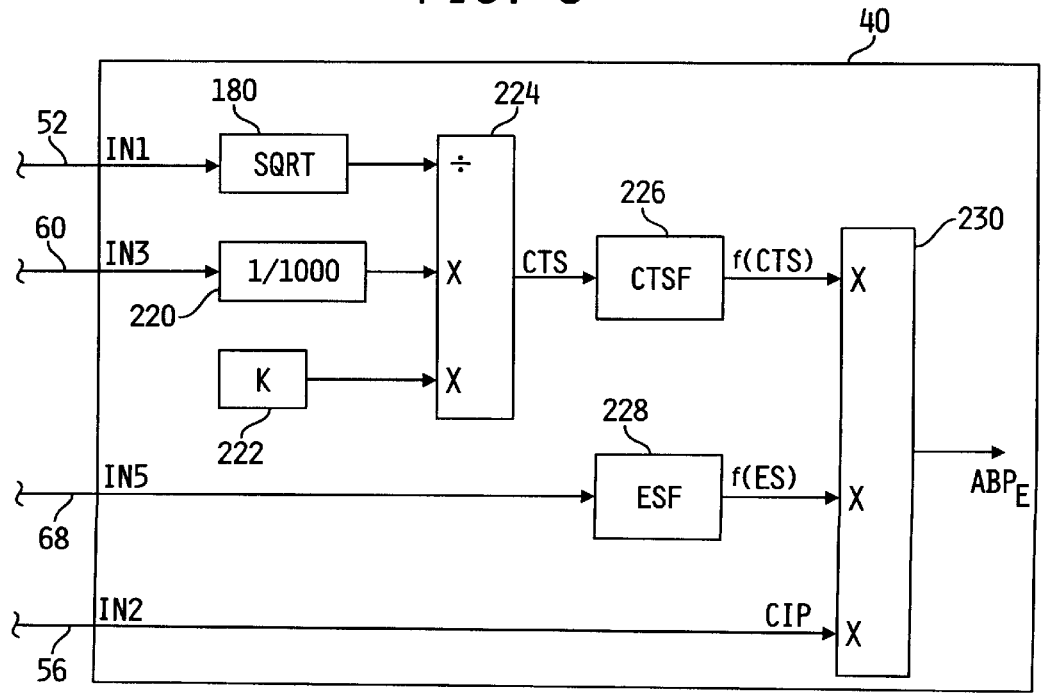
FIG. 9 is a diagrammatic illustration of one preferred embodiment of a portion of the control computer of FIG. 1 illustrating an alternate technique for estimating absolute boost pressure, in accordance with the present invention.

In a further alternate embodiment, the plot 190 of FIG. 7 may be modeled as a second order polynomial for CTS and a scaling function of ES according to the equation:

$$PR = (a + b*CTS + c*CTS^2)*f(ES) \qquad (10),$$

wherein the term $(a+b*CTS+c*CTS^2)$ represents the second-order CTS model and f(ES) is a scaling factor depending upon the current value of engine rotational speed, and a, b and c represent model constants. In this embodiment, engine controller 40 is operable to execute step 210 of algorithm 200 by solving equation (10) for PR, and then computing the absolute boost pressure estimate $ABP_E$ by multiplying the result by the current value of CIP. Referring to FIG. 9, a portion of engine controller 40 is shown illustrating one preferred software structure for computing the absolute boost pressure estimate, $ABP_E$, in accordance with equation (10). In this embodiment, controller 40 includes a SQRT block 180 receiving as an input the CIT signal on signal path 52 and producing as an output a value corresponding to the square root of CIT. A conversion block 220 receives as an input the turbocharger rotational speed signal, TS, on signal path 60 and produces as an output a scaled value (e.g., TS/1000) of the turbocharger rotational speed signal TS. A constant block 222 produces a constant value, K (e.g., 16.667), and an arithmetic block 224 is operable to receive the outs of blocks 180, 220 and 222 and produce as an output the temperature-corrected turbocharger rotational speed value CTS.

A turbocharger speed function block 226 receives the temperature-corrected turbocharger rotational speed value, CTS, and produces as an output the result of the CTS polynomial $(a+b*CTS+c*CTS^2)$ of equation (10). In one embodiment, block 226 may be implemented in the form of an equation, wherein block 226 is operable to compute $(a+b*CTS+cCTS^2)$ as a function of CTS. Alternatively, block 226 may be implemented in graphical or table form for mapping CTS values to $(a+b*CTS+c*CTS^2)$ values.

Figure 10:
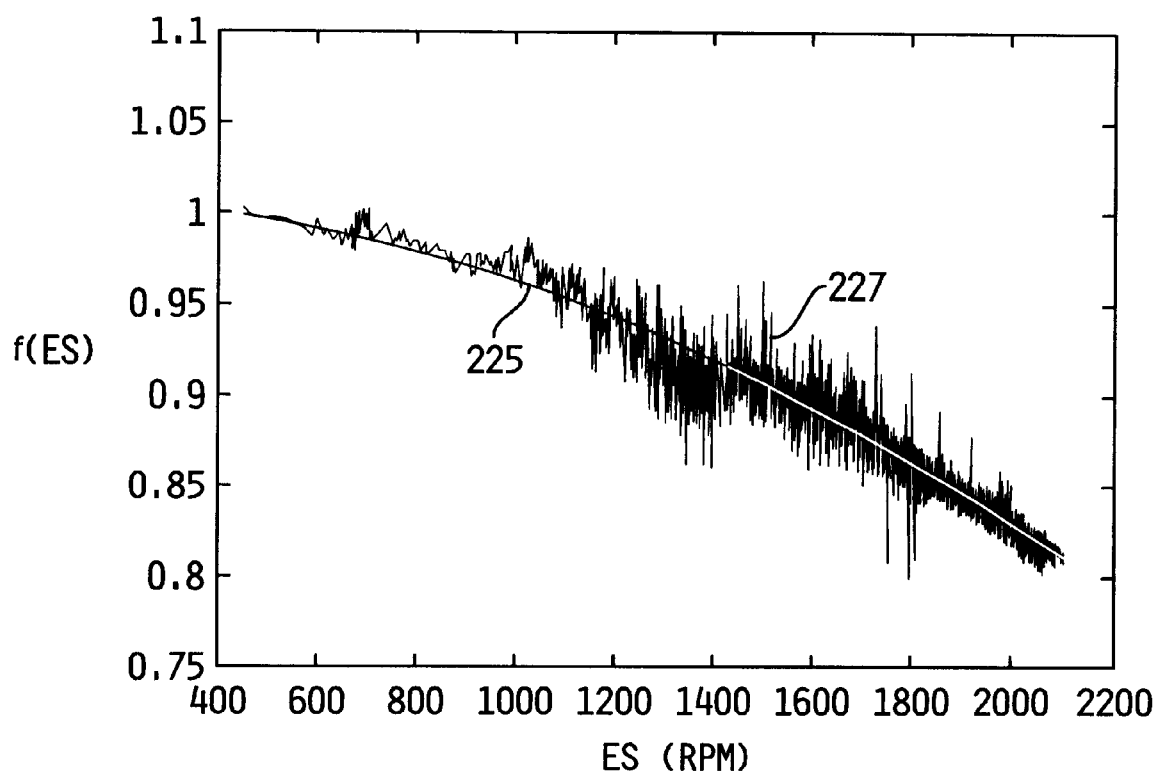
FIG. 10 is a plot of engine speed scaling factor vs. engine speed illustrating one preferred embodiment of the engine speed scaling factor block of FIG. 9.

An engine speed function block 228 receives the engine speed signal on signal path 68 and produces as an output the result of the engine speed scaling function of equation (10). In one embodiment, block 228 may be implemented as in the form of a scaling equation, wherein block 228 is operable to convert ES to an engine speed scaling factor in accordance with this equation. Alternatively, block 228 may be implemented in graphical or table form for mapping ES values to engine speed scaling factor values. In any case, one example engine speed scaling function 225 is illustrated in FIG. 10 along with test data 227 from which function 225 is derived. Those skilled in the art will recognize that other engine speed scaling functions may be used, wherein any such scaling function will generally be based on test data for the particular application.

The outputs of each of blocks 226 and 228, as well as the compressor inlet pressure signal, CIP, on signal path 56 are provided as inputs to a multiplication block 230 producing as an output the absolute boost pressure estimate, $TS_E$ according to the equation:

$$ABP_E = CIP*(a+b*CTS+c*CTS^2)*f(ES) \qquad (11).$$

Those skilled in the art will recognize that the accuracy of the absolute boost pressure estimate, $ABP_E$, may be further improved by considering additional engine operating conditions such as, for example, intake manifold temperature and/or EGR flow rate. In general, it will be recognized that there exists a tradeoff between estimate accuracy and model complexity, and it will accordingly be appreciated that the application requirements will generally dictate the required accuracy which will, in turn, dictate the model complexity.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. System for estimating turbocharger rotational speed, comprising:
   a turbocharger having a compressor defining an inlet and an outlet fluidly coupled via an intake conduit to an intake manifold of an internal combustion engine;
   a first pressure sensor producing a first pressure signal indicative of pressure of air within said intake conduit;
   a second pressure sensor producing a second pressure signal indicative of pressure of air entering said compressor inlet;
   a temperature sensor producing a temperature signal indicative of temperature of air entering said compressor inlet;
   a speed sensor producing a speed signal indicative of engine rotational speed; and
   a control computer estimating rotational speed of said turbocharger as a function of said first pressure, second pressure, speed and temperature signals.

2. The system of claim 1 wherein said control computer is operable to compute a compressor pressure ratio as a ratio of said first pressure signal and said second pressure signal, said control computer estimating said rotational speed of said turbocharger as a function of said compressor pressure ratio, said speed signal and said temperature signal.

3. The system of claim 2 further including a memory having a three-dimensional map stored therein, said map having a first dimension defined by a ratio of said rotational speed of said turbocharger and said temperature of air entering said compressor inlet, a second dimension defined by said compressor pressure ratio and a third dimension defined by said engine rotational speed;

and wherein said control computer is operable to estimate said rotational speed of said turbocharger by mapping current values of said compressor pressure ratio, said speed signal and said temperature signal to said rotational speed of said turbocharger via said map stored within said memory.

4. The system of claim 1 wherein said control computer includes:

means responsive to said temperature signal for determining a square root temperature value;

means responsive to said first and second pressure signals for determining a first function of a ratio of said first pressure signal and said second pressure signal;

means responsive to said speed signal for determining a second function thereof; and means for estimating said rotational speed of said turbocharger as a product of said square root temperature value, said first function and said second function.

5. A method for estimating turbocharger rotational speed, the method comprising the steps of:

determining a first pressure value corresponding to pressure of air entering an inlet of a turbocharger compressor;

determining a second pressure value corresponding to pressure of air supplied by an outlet of the compressor to an intake manifold of an internal combustion engine;

determining a temperature value corresponding to temperature of the air entering the inlet of the compressor;

determining rotational speed of the engine; and estimating the turbocharger rotational speed as a function of the first pressure value, the second pressure value, the temperature value and the rotational speed of the engine.

6. The method of claim 5 wherein the estimating step includes:

computing a compressor pressure ratio as a ratio of the first and second pressure values;

mapping current values of the compressor pressure ratio and the rotational speed of the engine to a temperature-corrected turbocharger rotational speed using a map stored within a memory unit; and computing the turbocharger rotational speed as a product of the temperature-corrected turbocharger rotational speed and a square root of the temperature value.

7. The method of claim 5 wherein the estimating step includes:

computing a compressor pressure ratio as a ratio of the first and second pressure values;

determining a first function of the compressor pressure ratio;

determining a second function of the rotational speed of the engine; and estimating the turbocharger rotational speed as a product of a square root of the temperature value, the first function and the second function.

8. System for estimating temperature-corrected turbocharger rotational speed, comprising:

a turbocharger having a compressor defining an inlet and an outlet fluidly coupled via an intake conduit to an intake manifold of an internal combustion engine;

a first pressure sensor producing a first pressure signal indicative of pressure of air within said intake conduit;

a second pressure sensor producing a second pressure signal indicative of pressure of air entering said compressor inlet;

a speed sensor producing a speed signal indicative of engine rotational speed; and a control computer estimating a temperature-corrected rotational speed of said turbocharger as a function of said first pressure, second pressure and speed signals.

9. The system of claim 8 further including a temperature sensor producing a temperature signal indicative of temperature of air entering said compressor inlet;

wherein said control computer is operable to estimate a rotational speed of said turbocharger as a ratio of said temperature-corrected rotational speed of said turbocharger and said temperature signal.

10. The system of claim 8 further including a memory having a three-dimensional map stored therein, said map having a first dimension defined by said temperature-corrected rotational speed of said turbocharger, a second dimension defined by a compressor pressure ratio computed as a ratio of said pressure of air within said intake conduit and said pressure of air entering said compressor inlet, and a third dimension defined by said engine rotational speed;

and wherein said control computer is operable to estimate said temperature-corrected rotational speed of said turbocharger by mapping current values of said compressor pressure ratio, said speed signal to said temperature-corrected rotational speed of said turbocharger via said map stored within said memory.

11. The system of claim 8 wherein said control computer includes:

means responsive to said first and second pressure signals for determining a first function of a ratio of said first pressure signal and said second pressure signal;

means responsive to said speed signal for determining a second function thereof; and means for estimating said rotational speed of said turbocharger as a product of said first function and said second function.

12. A method for estimating temperature-corrected turbocharger rotational speed, the method comprising the steps of:

determining a compressor pressure ratio corresponding to a ratio of air pressure within a conduit fluidly coupling a turbocharger compressor outlet to an intake manifold of an internal combustion engine and air pressure within an inlet of the compressor;

determining rotational speed of the engine; and estimating the temperature-corrected turbocharger rotational speed as a function of the compressor pressure ratio and the rotational speed of the engine.

13. The method of claim 12 wherein the estimating step includes mapping current values of the compressor pressure ratio and the rotational speed of the engine to the temperature-corrected turbocharger rotational speed using a map stored within a memory unit.

14. The method of claim 12 wherein the estimating step includes:
  determining a first function of the compressor ratio;
  determining a second function of the rotational speed of the engine; and
  estimating the temperature-corrected turbocharger rotational speed as a product of the first and second functions.

* * * * *

UNITED STATES PATENT AND TRADEMARK OFFICE
CERTIFICATE OF CORRECTION

PATENT NO. : 6,539,714 B1
DATED : April 1, 2003
INVENTOR(S) : Yue Yun Wang

It is certified that error appears in the above-identified patent and that said Letters Patent is hereby corrected as shown below:

<u>Column 10,</u>
Line 5, please delete "$(a+b*CTS+cCTS^2)$" and insert -- $(a+b*CTS+c*CTS^2)$ --.

Signed and Sealed this

Nineteenth Day of August, 2003

JAMES E. ROGAN
*Director of the United States Patent and Trademark Office*